US008162253B2

(12) United States Patent
Seiford, Sr.

(10) Patent No.: US 8,162,253 B2
(45) Date of Patent: Apr. 24, 2012

(54) CONVERTIBLE VEHICLE FOR ROAD, AIR, AND WATER USAGE (76) Inventor: Donald S. Seiford, Sr., Winter Garden, FL (US)

( * ) Notice: Subject to any disclaimer, the term of this patent is extended or adjusted under 35 U.S.C. 154(b) by 330 days.

(21) Appl. No.: 12/543,898

(22) Filed: Aug. 19, 2009

(65) Prior Publication Data
US 2011/0042507 A1  Feb. 24, 2011

(51) Int. Cl.
B64C 27/22 (2006.01)
(52) U.S. Cl. ........................................ 244/7 R
(58) Field of Classification Search ............ 244/2, 49, 244/7 R, 12.4
See application file for complete search history.

(56) References Cited

U.S. PATENT DOCUMENTS

| | | | | |
|---|---|---|---|---|
| 2,141,534 | A | * | 12/1938 | Hudson .......................... 244/49 |
| 2,762,584 | A | * | 9/1956 | Price ............................. 244/12.4 |
| 3,131,873 | A | | 5/1964 | Sanders |
| 3,371,886 | A | | 3/1968 | Schertz |
| 3,618,875 | A | | 11/1971 | Kappus |
| 4,579,297 | A | * | 4/1986 | Ayoola .............................. 244/2 |
| 5,050,817 | A | * | 9/1991 | Miller ............................... 244/2 |
| 5,141,173 | A | | 8/1992 | Lay |
| 5,758,844 | A | * | 6/1998 | Cummings ..................... 244/7 C |
| 6,138,943 | A | * | 10/2000 | Huang ............................... 244/2 |
| 6,568,630 | B2 | * | 5/2003 | Yoeli ........................... 244/23 R |
| 6,619,584 | B1 | | 9/2003 | Haynes |
| 7,246,769 | B2 | | 7/2007 | Yoeli |
| 7,874,513 | B1 | * | 1/2011 | Smith ........................... 244/12.4 |
| 2003/0094536 | A1 | * | 5/2003 | LaBiche ............................ 244/2 |

FOREIGN PATENT DOCUMENTS
WO    2007114877 A2    10/2007
* cited by examiner

Primary Examiner — Tien Dinh
Assistant Examiner — Keith L Dixon
(74) Attorney, Agent, or Firm — Ronald E. Greigg (57) ABSTRACT A convertible combined road, water, and aircraft vehicle has a road form, a water form, and an aircraft form. The vehicle includes a vehicle body having a passenger compartment and wheels supporting the vehicle body on the ground when in the road form. A wing assembly is attached to each side of the vehicle body. Each wing assembly includes a wing and at least one propelling device attached to the wing. The propelling devices may be jet engines, or ducted fans or in-wing propellers. A wing assembly rotating mechanism rotates the wing assembly 360 degrees when the vehicle is in the aircraft form so that thrust is provided in 360 degrees, allowing for vertical takeoff and landing and mid air hovering. A wing assembly positioning mechanism positions the wing assembly between an open-winged flying position and a folded or closed-winged non-flying position. A rear propelling assembly is provided to propel the vehicle in the air, and a tail assembly is provided which includes elements for maneuvering the vehicle in the air and water. The rear propelling assembly includes a rear propelling device and a propelling device positioning mechanism capable of positioning the rear propelling device through a range of at least 90 degrees between a position for providing the vehicle with vertical lift or thrust and a position for providing the vehicle with forward thrust. The rear propelling device may be a jet engine or a propeller. An operator's control unit is disposed in the passenger compartment with which an operator controls vehicle.

20 Claims, 8 Drawing Sheets

CONVERTIBLE VEHICLE FOR ROAD, AIR, AND WATER USAGE

BACKGROUND OF THE INVENTION

1. Field of the Invention

This invention relates to a combined road, air, and water vehicle which converts for different modes of usage.

2. Description of the Prior Art

Combined road and aircraft vehicles have heretofore been provided wherein by converting certain elements, the vehicle can be operated on the highway or in the air. For example, U.S. Pat. Nos. 5,050,817 and 4,579,297 illustrate structures which are converted from aircraft to road vehicles by folding the wings either into or to the sides of the body.

SUMMARY OF THE INVENTION

It is an object of the present invention to provide improvements in a combined road, water, and aircraft vehicle.

More particularly, it is an object of the invention to provide wing sections that readily pivot rearwardly and form side and rear panels for the road form of vehicle.

It is especially an object of the invention to provide wings that can rotate to provide thrust in a 360° direction in a convertible aircraft.

Another object is to provide a rear thruster that can be rotated 90° to anywhere from vertical to horizontal in a convertible aircraft.

Another object of the invention is to place jets, or ducted fans or propellers, on the rotatable wings and on the tail assembly of a convertible aircraft.

In carrying out the objectives of the invention, the vehicle having a body with front and rear wheels, and a propelling assembly. The propelling assembly is disposed at the rear of the vehicle body. Wing assemblies fold between an outward aircraft position and a folded stored position lying along the side of the body in the road form. Each wing is provided with a jet engine. A tail assembly includes a vertical stabilizer adjacent each side of the rear propelling assembly, a horizontal stabilizer, and vertical and horizontal rudders.

BRIEF DESCRIPTION OF THE DRAWINGS

The invention will be better understood and additional objects and advantages will become apparent from the following description taken in connection with the accompanying drawings, in which.

DETAILED DESCRIPTION OF THE PREFERRED EMBODIMENTS

Figure 1:
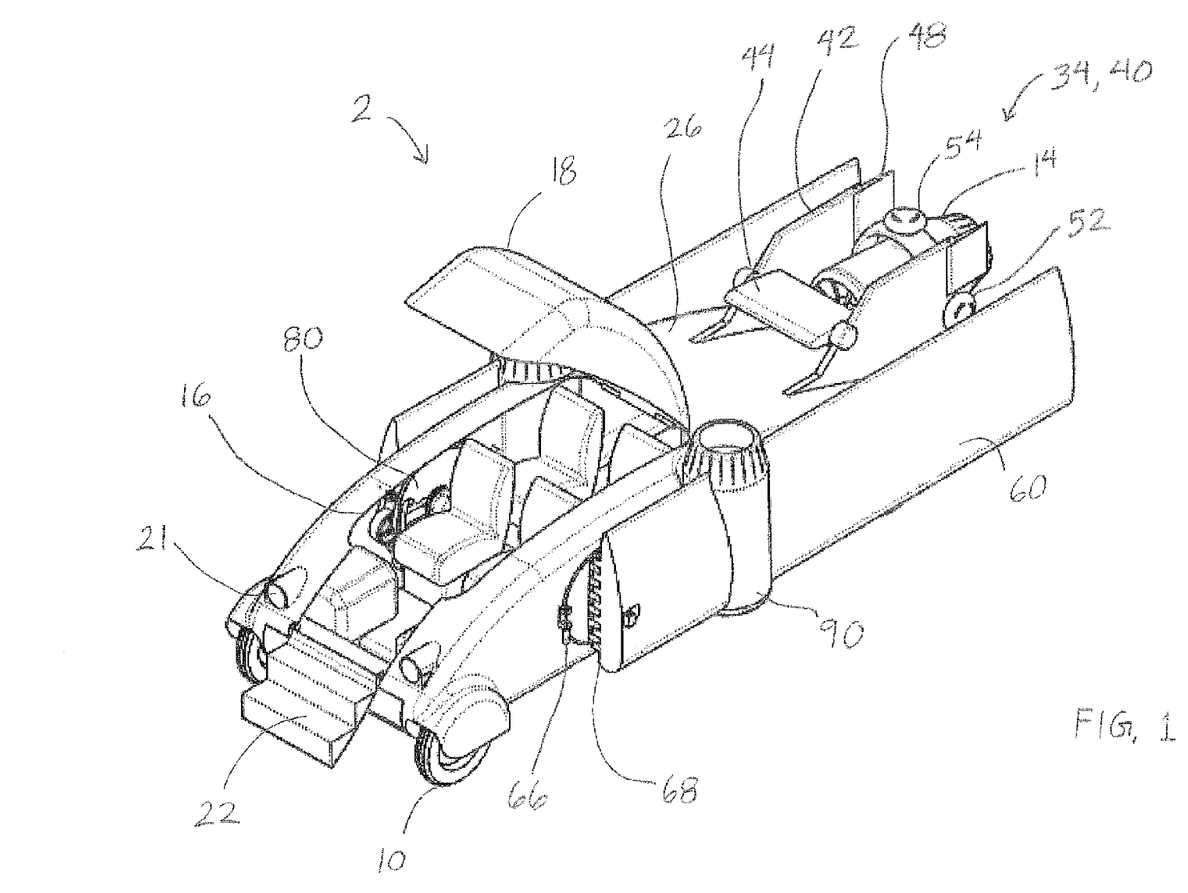
FIG. 1 is a front perspective view of the vehicle in a road ready mode according to a first embodiment of the invention.
Figure 2:
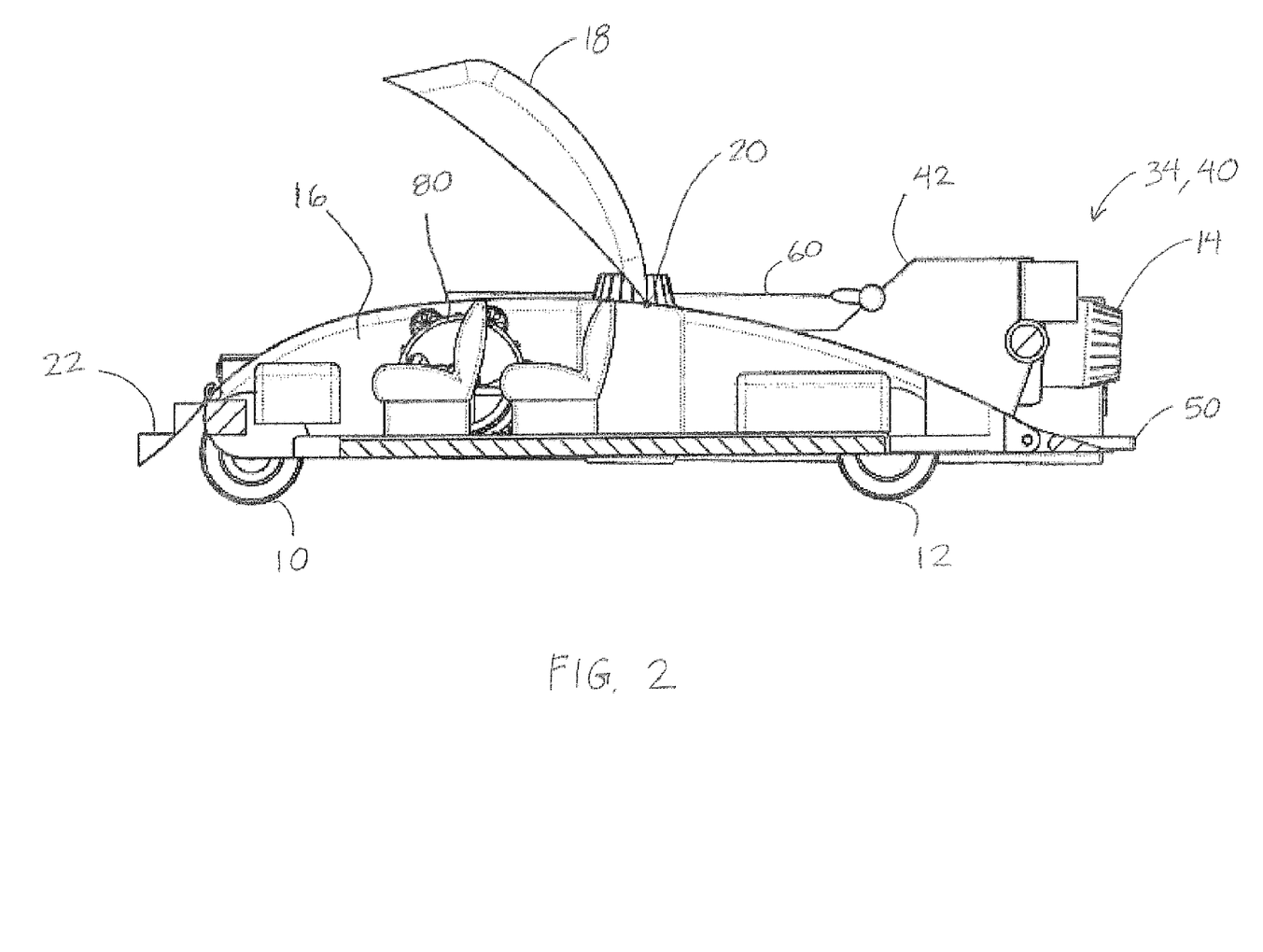
FIG. 2 is a side sectional view of the vehicle of FIG. 1.
Figure 3:
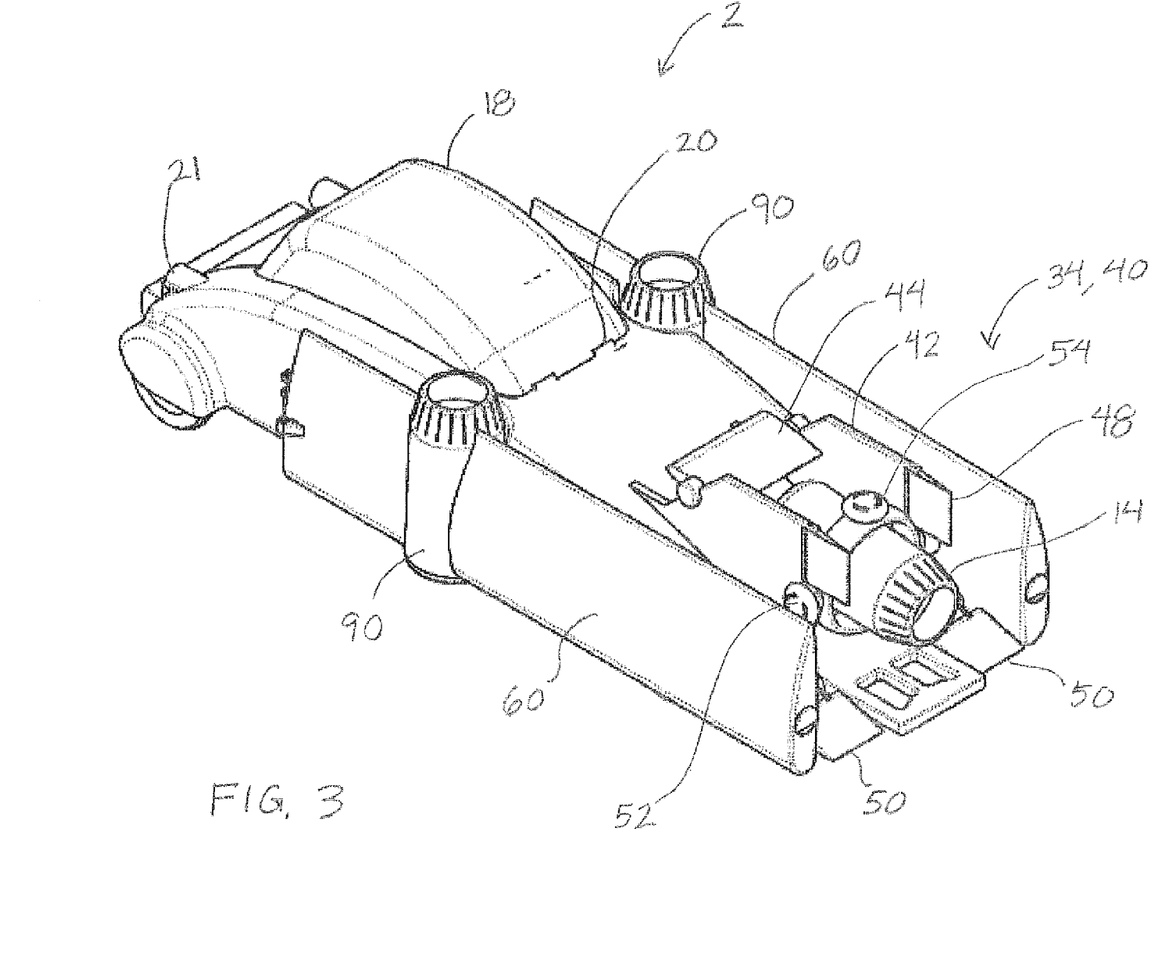
FIG. 3 is a rear perspective view of the vehicle according to the invention in a road ready mode.
Figure 4:
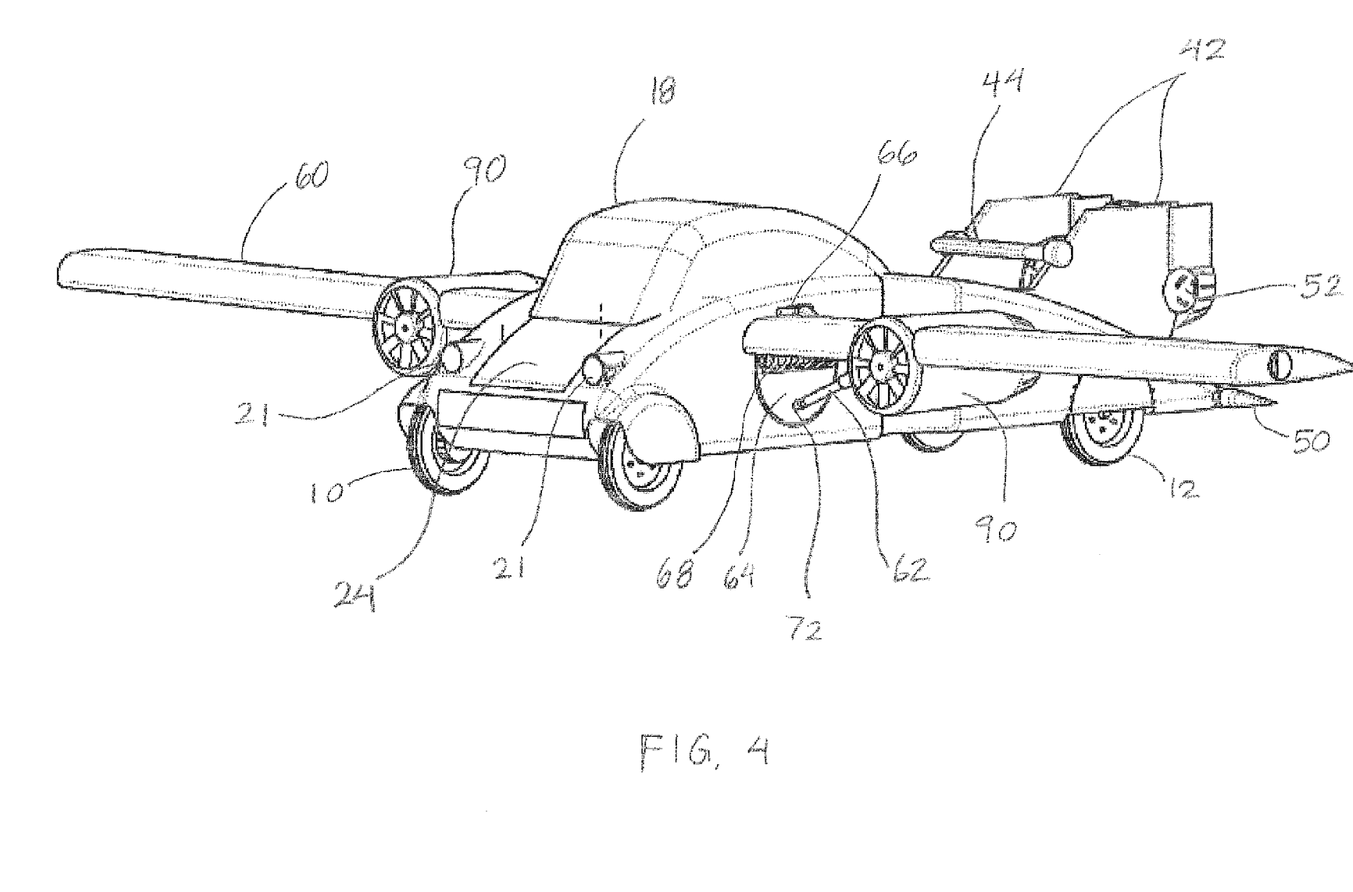
FIG. 4 is a front perspective view of the vehicle according to the invention in a flying mode.
Figure 5:
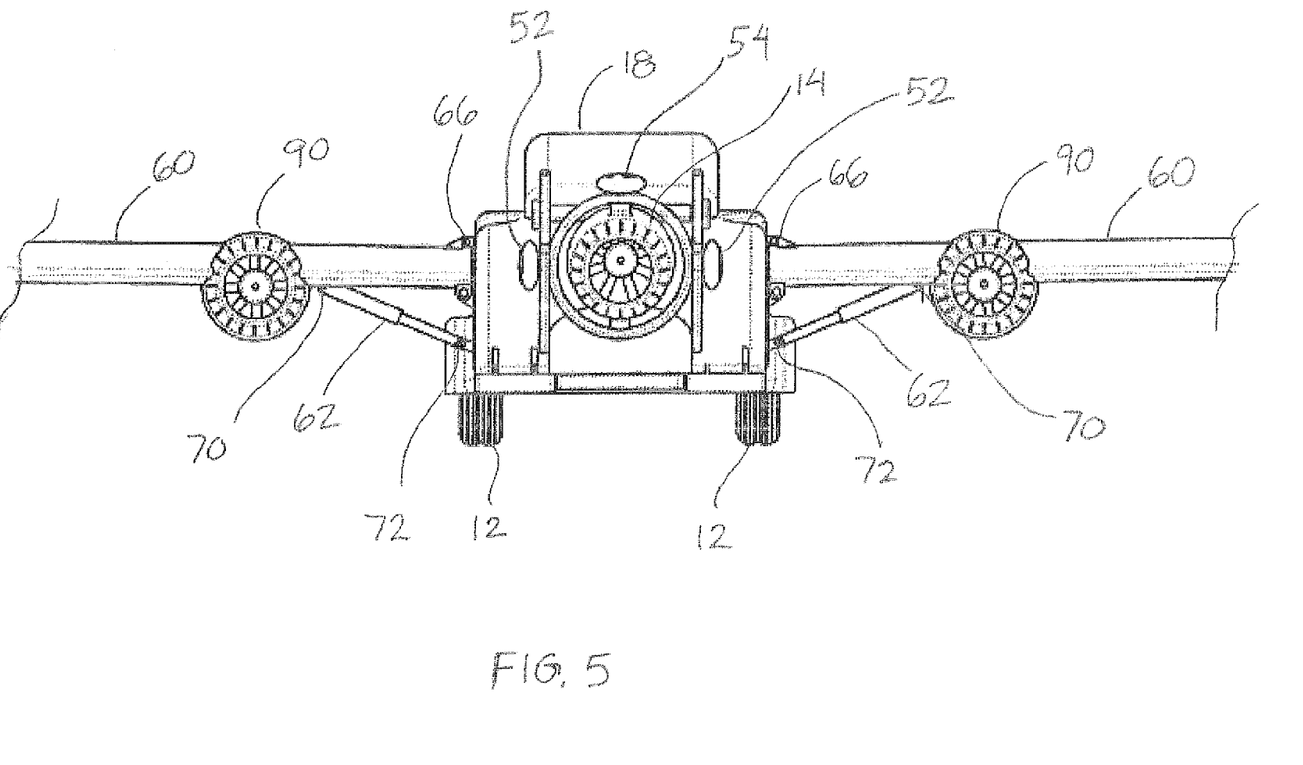
FIG. 5 is a rear view of the vehicle according to the invention of FIG. 4.
Figure 6:
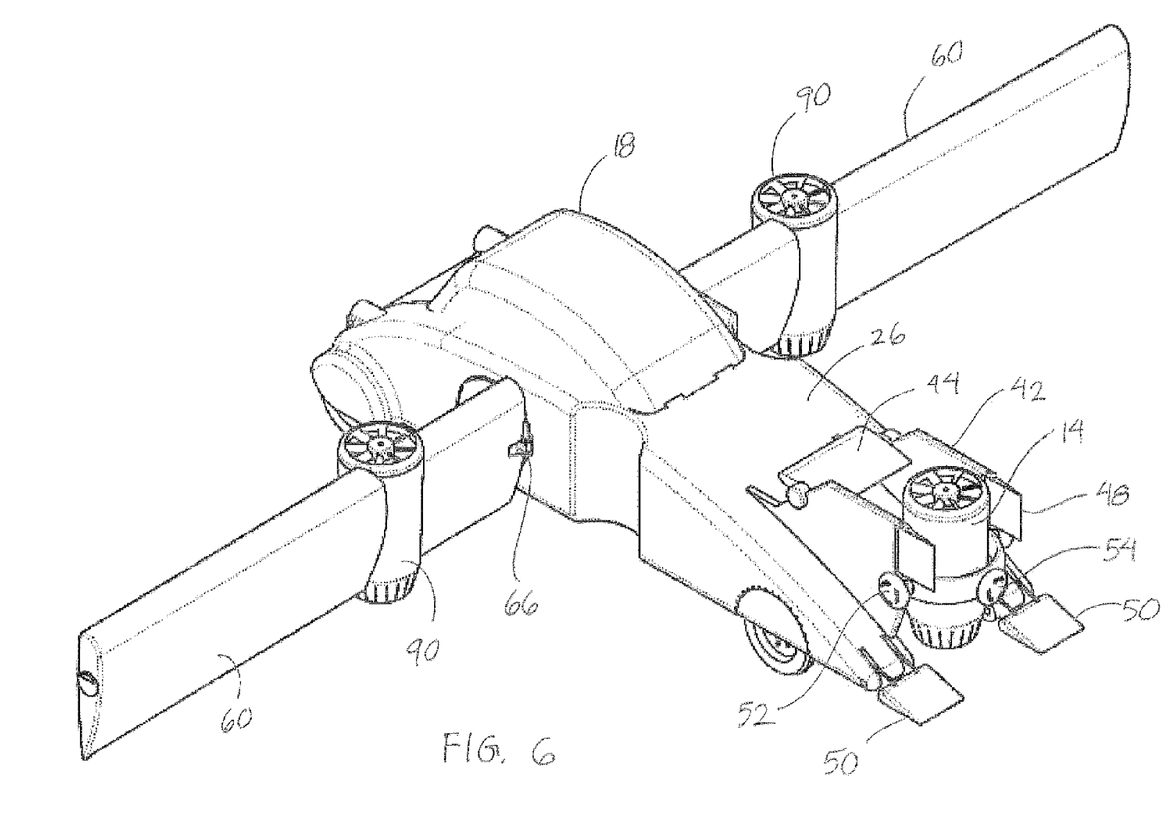
FIG. 6 is a perspective view of the vehicle according to the invention in a take-off mode.

With particular reference to the drawings, FIGS. 1-6 show a vehicle 2 according to a first embodiment of the invention. FIGS. 1-3 show the vehicle in its road ready form and FIGS. 4-6 show the vehicle converted to its aircraft or flying form. The vehicle 2 has a front wheels 10 and rear wheels 12. The front wheels 10 are steerable by any suitable conventional mechanism. The front and/or rear wheels are powered by high efficiency wheel motors for propelling the vehicle on the roadway. A jet engine 14 is located at the rear of the vehicle. An operator/passenger compartment 16 including a canopy windshield 18 provides access to and from the compartment 16 at the front of the vehicle 2. The canopy windshield 18 has a removable portion to provide a convertible mode for both the road and aircraft forms of the vehicle 2. In the convertible mode, front and rear windshields remain in place, while a middle overhead or roof portion is removed. The canopy windshield 18 is also hinged to the vehicle body at hinge 20 at the rear of the compartment 16 to allow the canopy windshield 18 to be opened and closed as a unit which includes the front and rear windshields and the middle roof portion. The compartment 16 is accessible by retractable steps 22 that fold out from the compartment 16 at the front of the vehicle 2. A hood 24 of the vehicle is formed when the steps are in a folded in, retracted position. Headlights 21 are provided on the sides of the hood 24. Alternatively, access to the compartment 16 may be made by entering through access windows (not numbered) provided on the driver and passenger sides of the vehicle 2.

Rearward of a body panel 26 at the rear of the driver's compartment 16 is a propelling assembly 34 for driving the vehicle 2 in its aircraft form. The propelling assembly 34 is mounted on the body panel 26 and includes the rear engine 14 and a tail assembly 40 for use of the vehicle 2 in its aircraft and water form.

Rearwardly of the propeller assembly 34 is the tail assembly 40 for use of the vehicle 2 in its aircraft and water form. The tail assembly 40 has a pair of side vertical stabilizers 42 connected together at the rear thereof by a horizontal stabilizer 44. Stabilizer 44 doubles as an elevator and the vertical stabilizers have conventional rudders 48. The tail assembly 40 also includes a pair of horizontal rudders 50 attached to the vehicle body extending over and behind the rear wheels 12. All of the rudders and the elevator are controlled by the operator from the compartment 16 by suitable means.

The rear jet engine 14 of the tail assembly 40 is rotatable by 90 degrees about a horizontal axis relative to the vehicle body, at pivot element 52, which is shown as a pancake type gear motor. The engine 14 is pivotally supported by the vertical stabilizers 42 and left and right side pivot elements 52 of the tail assembly. A mechanism (not shown in detail) is provided which rotates the engine 14 from a horizontal propelling position to a vertical propelling position. Furthermore, the rear jet engine 14 is rotatable about a vertical axis relative to the vehicle body, at pivot point element 54, also shown as a pancake type gear motor, so as to be positioned at varying angles within a horizontal plane. A mechanism (not shown in detail) is provided which rotates the engine 14 about pivot element 54.

The vehicle employs wings 60 capable of being folded to lie along the vehicle in the road form and capable of being extended out laterally in the aircraft form.

The wings 60 are each pivotally connected to a wing journal 64 by a hinge 68 and secured in an extended position by lock pin 66. The wing journals 64 are rotatable mounted to the sides of the vehicle body adjacent to the compartment 16. A mechanism 80 is provided on both sides of the compartment 16 for rotating the wing journal 64 of each wing 60. The wings are supported with extension arms 62 made of telescoping tube actuators which are attached at one end to the underside of each wing and at the other end to the respective wing journal 64. Extension arms 62 serve as reinforcing and anchoring struts for the wings 60 in the extended flying position of the wing 60 and in the retracted road position. Each wing 60 is provided with a jet engine 90. The wings 60 are retracted and extended by means of the telescoping tube actuators or hydraulic cylinders of the extension arms 62 and are rotated by means of the rotating mechanisms 80 for the wing journals 64. The wing journals 64 can be made for example with a rolled channel with cam rollers to bear the thrust load and wheels rolling in a channel web for example to bear the radial load. A standard type ball bearing could be used. Suitable control systems and mechanisms for automatic rotation and actuation of the wing assemblies are provided.

Figure 7:
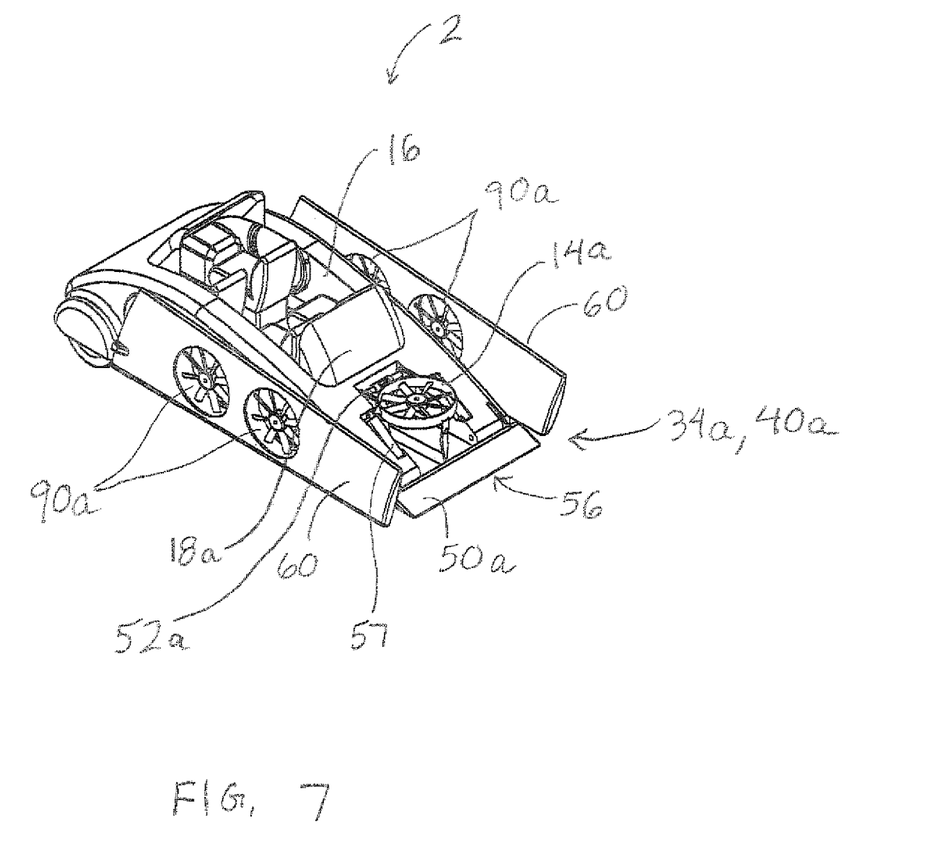
FIG. 7 is perspective view of the vehicle in a road ready mode according to a second embodiment of the invention.
Figure 8:
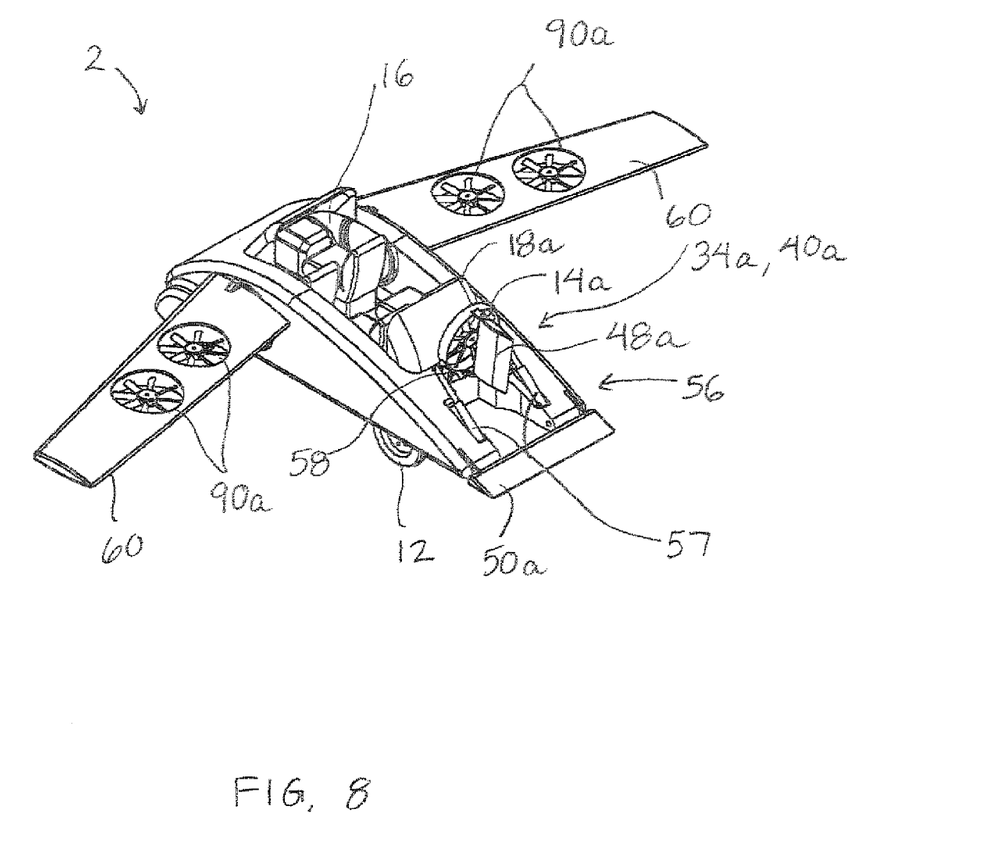
FIG. 8 is a perspective view of the vehicle in a flying mode according to the second embodiment of the invention.

With particular reference to the drawings, FIGS. 7 and 8 show the vehicle 2 according to a second embodiment of the invention. FIG. 7 shows the vehicle 2 in its road and water ready form and FIG. 8 shows the vehicle 2 converted to its aircraft or flying form. The second embodiment will be described and shown with like elements numbered the same as the first embodiment. The first and second embodiments of the convertible vehicle are substantially the same, except for the propulsion system which will be described hereinafter. Description of the like elements will thus be omitted.

In the second embodiment, shown in FIGS. 7 and 8, each wing 60 is provided with two ducted fans or in-wing propellers 90a which are fixed in their position relative to the wings 60. Rotation and positioning of the wings 60 in the second embodiment is the same as in the first embodiment and the description thereof will thus be omitted.

Rearwardly of rear windshield 18a and body panel 26 at the rear of the driver's compartment 16 is a propelling assembly 34a for driving the vehicle 2 in its aircraft form. The propelling assembly 34a includes a rear propeller 14a and tail assembly 40a for use of the vehicle in its aircraft and water form.

Rearwardly of the propeller assembly 34a is the tail assembly 40a for use of the vehicle in its aircraft and water form. The tail assembly 40a has a rudder 48a attached to the propeller 14a. The rudder 48a allows the vehicle to be rotated about a vertical axis while in its aircraft and water form. The tail assembly 40a also includes a horizontal rudder/stabilizer 50a attached to the vehicle body behind the rear wheels 12. All of the rudders are controlled by the operator from the compartment 16 by suitable means.

The rear propeller 14a is moveable about a horizontal pivot element 52a, between a horizontal position shown in FIG. 7 and a vertical position shown in FIG. 8. A mechanism 56 is provided which rotates the propeller 14a about the pivot element 52a. The mechanism 56 has two actuators 57 linked to the vehicle body at one end and to a frame 58 which supports the propeller 14a and the other end. The actuators 57 enable the propeller 14a to be positioned between a flat or upright position, depending on the operating mode of the vehicle.

In both embodiments of the invention, the body of the vehicle 2 and the wings 60 are aerodynamically shaped to provide vertical lift when flying. The wings 60 can be rotated 360° to provide lift and to advance the flying position. Additionally, by rotation of the wing assemblies in mid air, the vehicle can hover in a stationary position. The rear engine 14 or rear propeller 14a of the vehicle rotates from a vertical to a horizontal position for take off and landing and flying vertical take off or landing (VTOL) technology is used for both take-off and landing. When used as a car, the wings 60 are rotated and folded to lay flat against the sides of the car so that the site line is not blocked. To summarize, the rear thrusters can be propellers, jets or prop jets. In the propeller version of the flying car, there are two propellers 90a on each wing and the propellers are mounted within the body of the wing 60. In the jet version of the car, one jet 90 is mounted to each wing. A control system, i.e. a computer, could be used in automatic or manual mode for takeoff, landing and flying. The car is designed to float so that it can also be propelled in water by the rear engine 14 or rear propeller 14a, and steered by rudders 48a, 50, 50a. It is noted that a runway is not needed to take off and land the car. When used as a car, the propellers and jets are not used. Instead, the wheels of the car are driven by high efficiency hydraulic, air, or electric motors. It will be understood that all entrances, wheel wells, wing journals, windshields, etc. will be sealed so as to be watertight for use of the vehicle in its water form.

According to the present invention, a combined road, water, and aircraft vehicle is provided which is readily convertible from one form to the other. Such conversion is accomplished by a single person if necessary and without special tools and in a reasonably time. All the parts of the vehicle are intact and merely pivot or rotate into place during conversion.

The operating modes of the convertible vehicle will be described hereinafter. The road and water ready mode of the vehicle are shown in FIGS. 3 and 7. In the first embodiment, the jet engine 14 is in a horizontal position, and in the second embodiment the propeller 14a is in a flat or down position. The wings 60 are folded back and rotated with the jets 90 facing downward in the first embodiment. The take-off mode of the vehicle is shown in FIGS. 6 and 8. The jet engine 14 is in a vertical position and the propeller 14a is in a vertical or up position. The wings 60 are unfolded, open and rotated so as to be vertical, with the jets 90 facing downward in the first embodiment. The wings 60 are unfolded, open, and not rotated so as to be horizontal, with the wing propellers 90a oriented within the wing to provide lift. The flying mode is shown in FIGS. 4, 5, and 8. The jet engine 14 is in a horizontal position, and the rear propeller 14a is in the vertical or up position. The wings 60 are unfolded, open, and not rotated, so as to be horizontal with the jets 90 positioned horizontally. In the second embodiment the wings 60 are in the same position as for the take-off mode.

It will be understood that the vehicle according to the invention is provided with all Department of Transportation (DOT), Federal Aviation Administration (FAA), and Coastguard required safety equipment for road, air, and water travel. Furthermore, the vehicle as described is designed for public use, however other applications such as military, law enforcement, and search and rescue also apply.

It is to be understood that the embodiments of the invention herein shown and described are to be taken as a preferred examples of the same and that various changes in the shape, size and arrangement of parts may be resorted to without departing from the spirit of the invention, or the scope of the appended claims.

I claim:

1. A convertible combined road, water, and aircraft vehicle which has a road form, a water form, and an aircraft form, comprising:
   a vehicle body having a passenger compartment;
   wheels supporting the vehicle body on the road when in the road form;
   a wing assembly attached to each side of the vehicle body, which support the vehicle when flying in the air in the aircraft form of the vehicle and which folds to align with sides of the vehicle body when in the road or water form of the vehicle, each wing assembly including a wing and at least one propelling device attached to the wing;

a wing assembly rotating mechanism provided for each wing assembly, capable of rotating the entire wing assembly at least 90 degrees relative to the vehicle body when the vehicle is in the aircraft form so that thrust is provided by the propelling devices of the wing assembly in at least a 90 degree range;

a wing assembly positioning mechanism provided for each wing assembly, capable of positioning the wing assembly between an open-winged flying position and a folded or closed-winged non-flying position;

a rear propelling assembly which propels the vehicle in the air, the rear propelling assembly including a rear propelling device and a propelling device positioning mechanism which pivots the rear propelling device about a vertical axis relative to the vehicle body which maneuvers the vehicle laterally when in the air and water; and a tail assembly that comprises a pair of side vertical stabilizers connected together by a horizontal stabilizer, wherein said vertical stabilizers pivotally support the rear propelling device.

2. The convertible combined road, water, and aircraft vehicle according to claim 1, further comprising an operator's control unit disposed in the passenger compartment with which an operator controls the wheels, the wing assemblies, the wing assembly rotating mechanism, the wing assembly positioning mechanism, the rear propelling assembly, and the tail assembly.

3. The convertible combined road, water, and aircraft vehicle according to claim 1, wherein the propelling device positioning mechanism is also capable of positioning the rear propelling device through a range of at least 90 degrees about a horizontal axis relative to the vehicle body between a position for providing the vehicle with vertical lift or thrust and a position for providing the vehicle with forward thrust.

4. The convertible combined road, water, and aircraft vehicle according to claim 1, wherein the wing assembly rotating mechanisms are capable of rotating the wing assemblies 360 degrees when the vehicle is in the aircraft form so that thrust is provided by the propelling devices of the wing assembly in a 360 degree range.

5. The convertible combined road, water, and aircraft vehicle according to claim 3, wherein the wing assembly rotating mechanisms are capable of rotating the wing assemblies 360 degrees when the vehicle is in the aircraft form so that thrust is provided by the propelling devices of the wing assembly in a 360 degree range.

6. The convertible combined road, water, and aircraft vehicle according to claim 1, wherein the propelling devices of the wing assemblies are jet engines.

7. The convertible combined road, water, and aircraft vehicle according to claim 3, wherein the propelling devices of the wing assemblies are jet engines.

8. The convertible combined road, water, and aircraft vehicle according to claim 1, wherein the propelling devices of the wing assemblies are ducted fans or in-wing propellers.

9. The convertible combined road, water, and aircraft vehicle according to claim 3, wherein the propelling devices of the wing assemblies are ducted fans or in-wing propellers.

10. The convertible combined road, water, and aircraft vehicle according to claim 1, wherein the rear propelling assembly includes a jet engine.

11. The convertible combined road, water, and aircraft vehicle according to claim 3, wherein the rear propelling device is a jet engine.

12. A convertible combined road, water, and aircraft vehicle which has a road form, a water form, and an aircraft form, comprising:

a vehicle body having a passenger compartment;

wheels supporting the vehicle body on the road when in the road form;

a wing assembly attached to each side of the vehicle body, which support the vehicle when flying in the air in the aircraft form of the vehicle and which folds to align with sides of the vehicle body when in the road or water form of the vehicle, each wing assembly including a wing and at least one propelling device attached to the wing;

a wing assembly rotating mechanism provided for each wing assembly, capable of rotating the entire wing assembly at least 90 degrees relative to the vehicle body when the vehicle is in the aircraft form so that thrust is provided by the propelling devices of the wing assembly in at least a 90 degree range;

a wing assembly positioning mechanism provided for each wing assembly, capable of positioning the wing assembly between an open-winged flying position and a folded or closed-winged non-flying position;

a rear propelling assembly which propels the vehicle in the air which includes a rear propelling device and a propelling device positioning mechanism capable of positioning the rear propelling device through a range of at least 90 degrees about a horizontal axis relative to the vehicle body between a position for providing the vehicle with vertical lift or thrust and a position for providing the vehicle with forward thrust; and a tail assembly that comprises a pair of side vertical stabilizers connected together by a horizontal stabilizer, wherein said vertical stabilizers pivotally support the rear propelling device.

13. The convertible combined road, water, and aircraft vehicle according to claim 1, wherein the rear propelling assembly includes a propeller.

14. The convertible combined road, water, and aircraft vehicle according to claim 3, wherein the rear propelling device is a propeller.

15. The convertible combined road, water, and aircraft vehicle according to claim 1, wherein the tail assembly includes at least one rudder.

16. The convertible combined road, water, and aircraft vehicle according to claim 12, wherein the rear propelling device is a jet engine.

17. The convertible combined road, water, and aircraft vehicle according to claim 12, further comprising an operator's control unit disposed in the passenger compartment with which an operator controls the wheels, the wing assemblies, the wing assembly rotating mechanism, the wing assembly positioning mechanism, the rear propelling assembly, and the tail assembly.

18. The convertible combined road, water, and aircraft vehicle according to claim 12, wherein the wing assembly rotating mechanisms are capable of rotating the wing assemblies 360 degrees when the vehicle is in the aircraft form so that thrust is provided by the propelling devices of the wing assembly in a 360 degree range.

19. The convertible combined road, water, and aircraft vehicle according to claim 12, wherein the propelling devices of the wing assemblies are ducted fans or in-wing propellers.

20. The convertible combined road, water, and aircraft vehicle according to claim 12, wherein the tail assembly includes at least one rudder.

* * * * *